(12) United States Patent
Barnes et al.

(10) Patent No.: US 11,505,036 B2
(45) Date of Patent: Nov. 22, 2022

(54) COMPRESSION MOLDED PRV SEALING FLAP

(71) Applicant: ILLINOIS TOOL WORKS INC., Glenview, IL (US)

(72) Inventors: Timothy M. Barnes, Leominster, MA (US); Michael Raymond Markie, Roseville, MI (US); Erin Michael Daly, Windsor (CA)

(73) Assignee: Illinois Tool Works Inc., Glenview, IL (US)

( * ) Notice: Subject to any disclaimer, the term of this patent is extended or adjusted under 35 U.S.C. 154(b) by 696 days.

(21) Appl. No.: 16/299,626

(22) Filed: Mar. 12, 2019

(65) Prior Publication Data
US 2019/0275863 A1 Sep. 12, 2019

Related U.S. Application Data

(60) Provisional application No. 62/641,770, filed on Mar. 12, 2018.

(51) Int. Cl.
*B60H 1/24* (2006.01)
*F16K 17/04* (2006.01)
*B60H 1/00* (2006.01)

(52) U.S. Cl.
CPC ......... *B60H 1/249* (2013.01); *F16K 17/0426* (2013.01); *B60H 2001/006* (2013.01)

(58) Field of Classification Search
CPC . B60H 1/249; B60H 2001/006; F16K 7/0426; F16K 17/01; B29C 45/561
USPC ......................................................... 454/70
See application file for complete search history.

(56) References Cited

U.S. PATENT DOCUMENTS

| | | | | |
|---|---|---|---|---|
| 2002/0195108 | A1* | 12/2002 | Mittelstadt | F16K 15/16 128/206.15 |
| 2016/0193897 | A1* | 7/2016 | Fiebiger | B60H 1/246 454/162 |
| 2017/0320377 | A1 | 11/2017 | Huet | |

FOREIGN PATENT DOCUMENTS

| | | | |
|---|---|---|---|
| EP | 1428704 A2 | | 6/2004 |
| JP | 2002036861 A | * | 2/2002 |
| JP | 2002036861 A | | 2/2002 |

OTHER PUBLICATIONS

English translation of JP2002036861A (Year: 2002).*
Compress, v. _ Oxford English Dictionary; definition of verb compress; accessed Mar. 16, 2022 (Year: 2022).*

(Continued)

*Primary Examiner* — Jessica Yuen
(74) *Attorney, Agent, or Firm* — Quarles & Brady LLP

(57) ABSTRACT

A pressure relief valve flap includes an attachment portion, a main portion, and a hinge portion. The attachment portion is configured to be attached to the housing. The main portion has a lip and at least one damping feature. The lip extends around at least a portion of a periphery of the main portion. The hinge portion is disposed between and connects the main portion and the attachment portion. When the attachment portion is attached to the housing, the main portion is configured to move between a closed position and an opened position. When the main portion moves from the opened position to the closed position, the at least one damping feature is configured to engage the housing prior to the lip of the main portion and thereby dampen noise created when the lip of the main portion engages the housing.

20 Claims, 6 Drawing Sheets

(56) References Cited

OTHER PUBLICATIONS

JP2002036861A_Description_20220316_1708; additional machine translation of JP2002036861A (Year: 2002).*
International Search Report and Written Opinion of the International Searching Authority from corresponding PCT Application No. PCT/US2019/021849, dated Sep. 2, 2019 (19 pages).

* cited by examiner

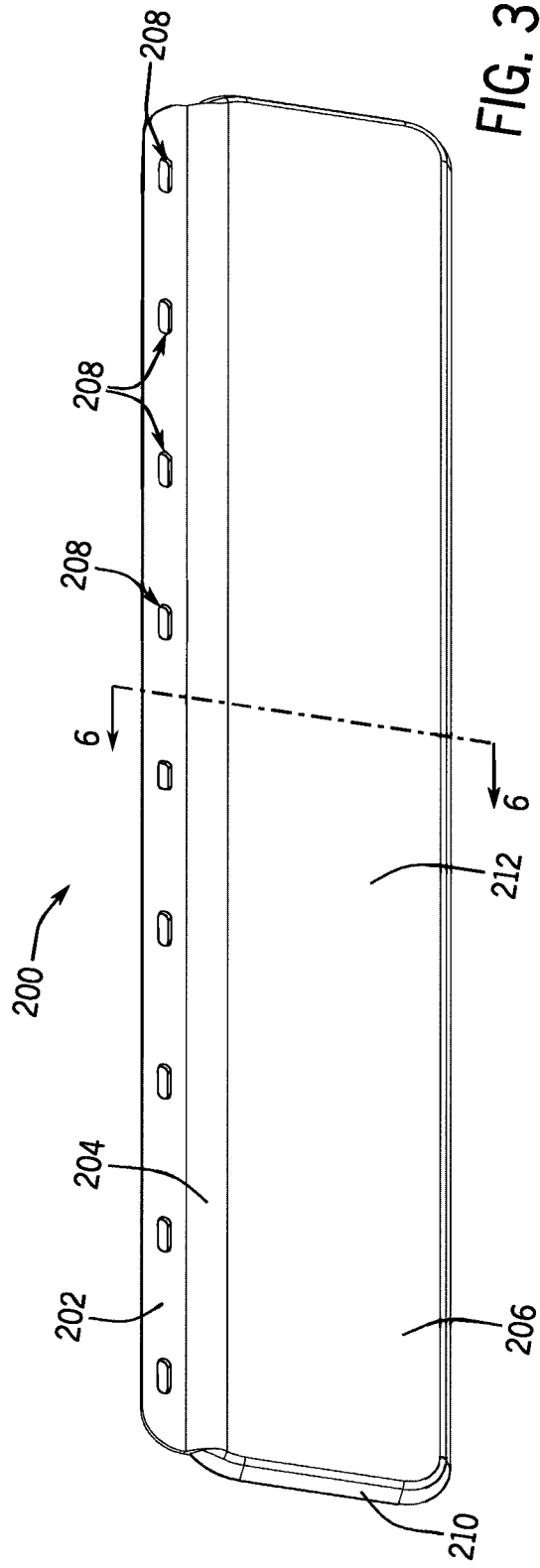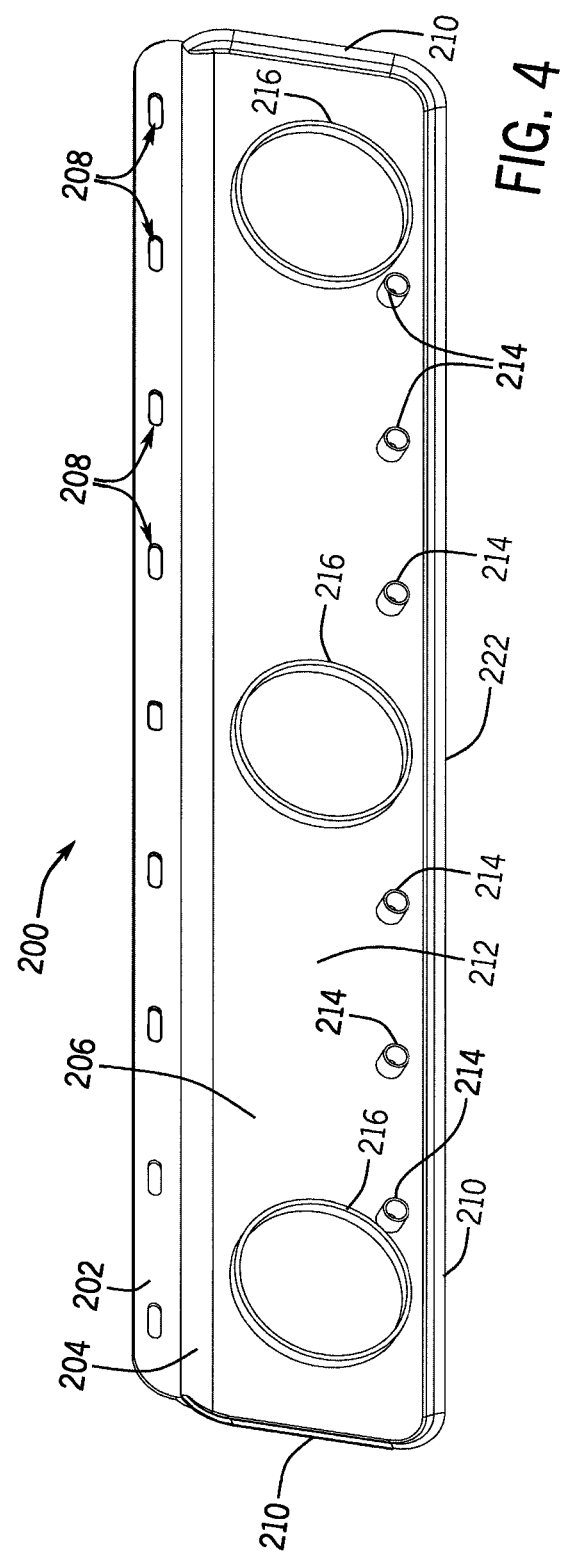

COMPRESSION MOLDED PRV SEALING FLAP

CROSS-REFERENCE TO RELATED APPLICATIONS

The present application is based on, claims priority to, and incorporates in its entirety U.S. Provisional Application No. 62/641,770, filed on Mar. 12, 2018, and entitled "Compression Molded PRV Sealing Flap."

FIELD OF THE INVENTION

The present invention relates to pressure relief valves, and more particularly to flaps for pressure relief valves.

BACKGROUND

Pressure Relief Valve (PRV) flaps have traditionally been manufactured by either die cutting ethylene propylene diene terpolymer (EPDM) or injection molding thermoplastic vulcanizate (TPV). However, EPDM die cut flaps generally do not allow for the implementation of added contact features, and are generally limited to flat surfaces. Additionally, during the manufacturing process of injection molded flaps, internal molding stress creates a condition in which distortion and warp are inherent. This distortion and warp may be further exacerbated by typical thermal cycles experienced by the flaps during use. Distortion and warp of the flaps may lead to a compromised sealing of the reverse air flow sealing.

SUMMARY

In one aspect, a pressure relief system configured to provide pressure relief between an internal vehicle pressure and an external vehicle pressure is provided. The pressure relief system comprises a housing and a pressure relief valve flap. The housing has an opening. The pressure relief valve flap comprises an attachment portion, a main portion, and a hinge portion. The attachment portion is attached to the housing. The main portion has at least one damping feature and is movable between a closed position, in which a periphery of the main portion engages the housing around the opening and provides a pressure-dependent seal between the main portion and the housing, and an opened position, in which the main portion is disengaged from the housing. The hinge portion is disposed between and connects the main portion and the attachment portion. When the main portion moves from the opened position to the closed position, the at least one damping feature is configured to engage the housing prior to the periphery of the main portion and thereby dampen noise created when the periphery of the main portion engages the housing.

In some aspects, the housing may further include at least one support rib extending across the opening. When the main portion moves from the opened position to the closed position, the at least one damping feature may be configured to engage the at least one support rib. The hinge portion may be configured to bias the main portion into the closed position. The at least one damping feature may be at least one primary damping feature, and the main portion may further include at least one secondary damping feature, the at least one secondary damping feature defining a smaller height than the primary damping feature in a direction perpendicular to the main portion. The main portion may further comprise a lip extending around at least a portion of the periphery of the main portion. The pressure relief valve flap may be formed as a single integral unit in a compression molding process. The at least one damping feature may be a plurality of damping features, and each damping feature of the plurality of damping features may be configured to engage the housing prior to the periphery of the main portion.

In another aspect, a pressure relief valve flap configured to be mounted in a housing to provide pressure relief between an internal vehicle pressure and an external vehicle pressure is provided. The housing has an opening. The pressure relief valve flap comprises an attachment portion, a main portion, and a hinge portion. The attachment portion is configured to be attached to the housing. The main portion has a lip and at least one damping feature. The lip extends around at least a portion of a periphery of the main portion. The hinge portion is disposed between and connecting the main portion and the attachment portion. When the attachment portion is attached to the housing, the main portion is configured to move between a closed position, in which the lip of the main portion engages the housing around the opening and provides a pressure-dependent seal between the main portion and the housing, and an opened position, in which the main portion is disengaged from the housing. When the main portion moves from the opened position to the closed position, the at least one damping feature is configured to engage the housing prior to the lip of the main portion and thereby dampen noise created when the lip of the main portion engages the housing.

In some aspects, when the attachment portion is attached to the housing, the hinge portion may be configured to bias the main portion into the closed position. The at least one damping feature may define a hollow, cylindrical shape. The at least one damping feature may be at least one primary damping feature, and the main portion may further include at least one secondary damping feature. The pressure relief valve flap may be formed as a single integral unit in a compression molding process. The at least one damping feature may be a plurality of damping features, and each damping feature of the plurality of damping features may be configured to engage the housing prior to the lip of the main portion.

In another aspect, a pressure relief valve flap configured to be mounted in a housing to provide pressure relief between an internal vehicle pressure and an external vehicle pressure is provided. The housing has an opening. The pressure relief valve flap comprises an attachment portion, a main portion, and a hinge portion. The attachment portion is configured to be attached to the housing. The main portion has at least one damping feature. The hinge portion is disposed between and connecting the main portion and the attachment portion. The pressure relief valve flap is formed as a single integral unit in a compression molding process. When the attachment portion is attached to the housing, the main portion is configured to move between a closed position, in which a periphery of the main portion engages the housing around the opening to provide a pressure-dependent seal between the main portion and the housing, and an opened position, in which the main portion is disengaged from the housing. The hinge portion is configured to bias the main portion into the closed position.

In some aspects, when the main portion moves from the opened position to the closed position, the at least one damping feature may be configured to engage the housing prior to the periphery of the main portion and thereby dampen noise created when the periphery of the main portion engages the housing. The at least one damping feature may define a hollow, cylindrical shape. The at least one damping feature may be at least one primary damping feature, and the main portion may further include at least one secondary damping feature. The main portion may further include a lip extending around at least a portion of the periphery of the main portion, the lip being configured to engage the housing when the main portion is in the closed position. The at least one damping feature may be a plurality of damping features, and each damping feature of the plurality of damping features may be configured to engage the housing prior to the periphery of the main portion.

Other features and advantages of the invention will become apparent to those skilled in the art upon review of the following detailed description, claims and drawings in which like numerals are used to designate like features.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings.

FIG. 3 is a front perspective view of the upper pressure relief valve flap of FIG. 1, in accordance with aspects of the present disclosure;

FIG. 4 is a rear perspective view of the upper pressure relief valve flap of FIG. 3;

DETAILED DESCRIPTION

Aspects of the present disclosure provide pressure relief valve (PRV) flaps that include an integral hinge and/or damping features. The PRV flaps may be used in connection with an automobile or other vehicle. The flaps may be mounted in a housing and move relative to the housing to help control the flow of air. For example, a compression molded PRV flap in accordance with various embodiments includes one or more damping features. The damping features in various embodiments are integrally formed with the flap. The damping features may interact with corresponding portions of the housing. The damping features include one or more raised surfaces (e.g., raised with respect to a central or main portion of the flap) that contact a housing in which the flap is mounted before the central or main portion of the flap. The total contact surface with the housing is accordingly reduced, resulting in less energy being transferred when the flap returns and seals. Accordingly, flap noise is reduced.

In various embodiments, a hinge feature is also formed integrally as part of the flap, for example as part of a compression molding process. For example, the size (e.g., thickness) and shape of the flap in a predetermined region may be configured to provide a hinging action. The hinge feature in various embodiments helps reduce forward air flow resistance, and helps to reduce tension or a spring-back condition when the flap returns to seal. Further, the hinge feature may enhance the ability to open and evacuate vehicle cabin air under low pressure. It may be appreciated that, although the provided examples below describe using the disclosed PRV flap in an automotive setting between an internal vehicle pressure and an external vehicle pressure, the PRV flap may be used in other settings or manners, as desired, depending on a given application.

Figure 1:
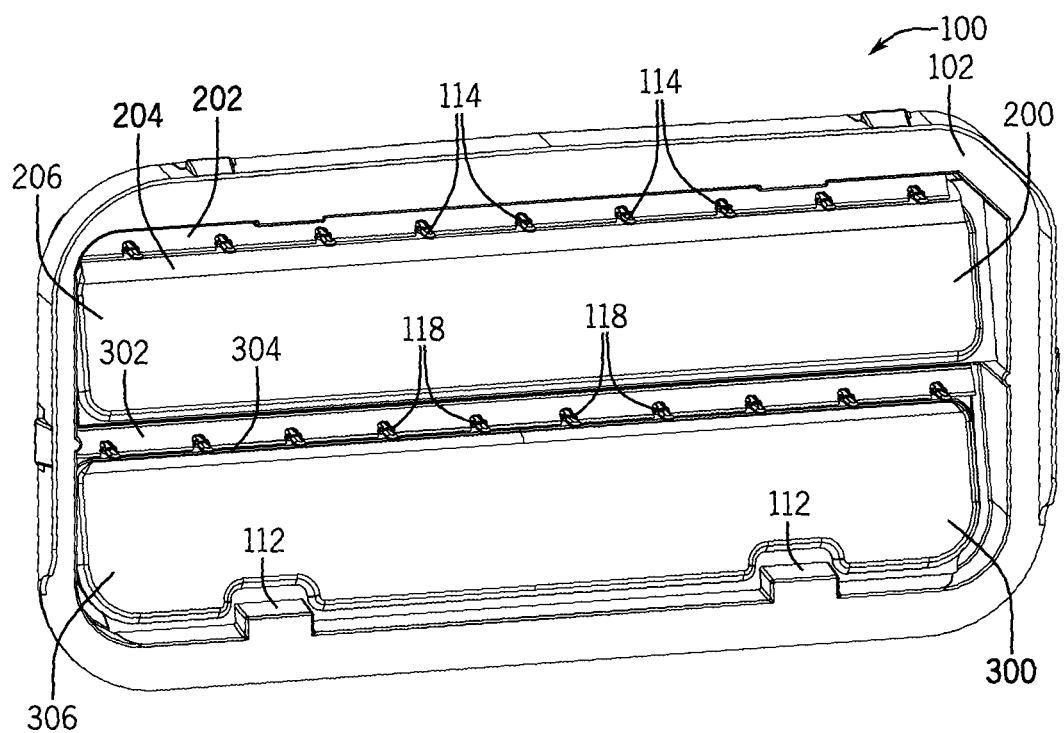
FIG. 1 is a front perspective view of a housing attached to an upper pressure relief valve flap and a lower pressure relief valve flap, in accordance with aspects of the present disclosure.
Figure 2:
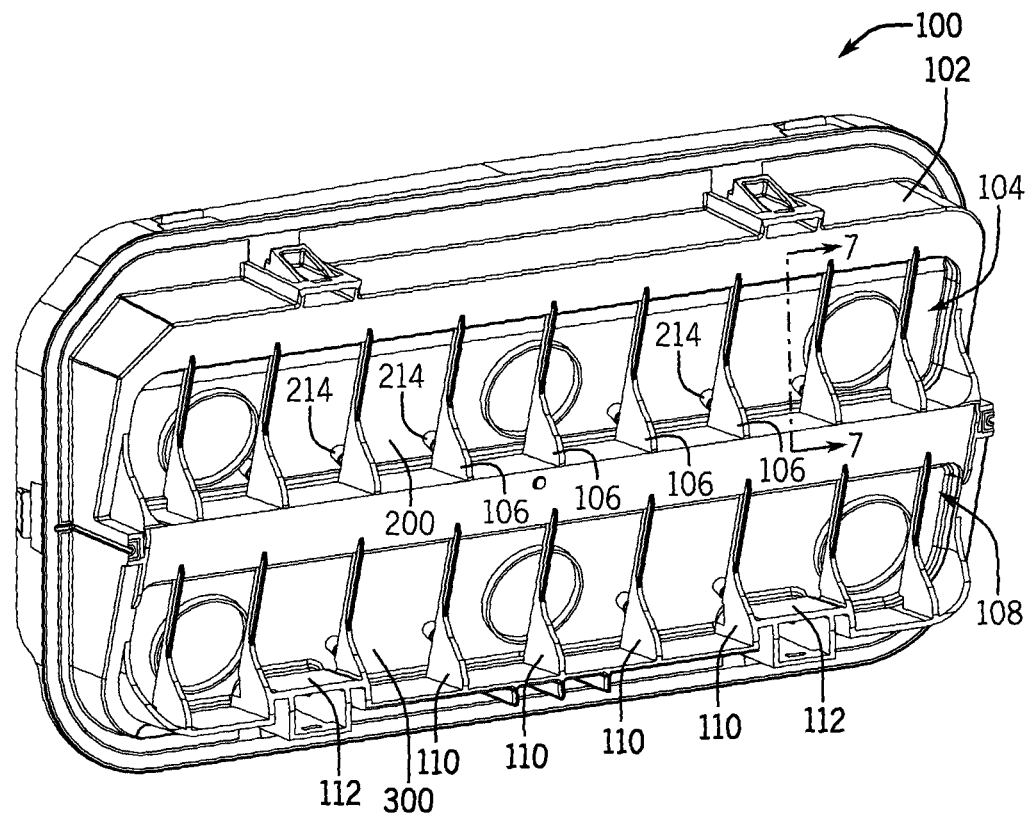
FIG. 2 is a rear perspective view of the housing of FIG. 1.

Referring now to FIGS. 1 and 2, a pressure relief system 100 configured to provide pressure relief between an internal vehicle pressure and an external vehicle pressure is shown. The pressure relief system 100 includes a housing 102 having an upper PRV flap 200 and a lower PRV flap 300 installed thereon. In some examples, the housing 102 may be a conventional housing previously used in connection with conventional flaps, and the PRV flaps 200, 300 may be configured to be retrofitted into the housing 102. As best shown in FIG. 2, the upper PRV flap 200 is attached to the housing 102 over an upper opening 104. The upper opening 104 includes a plurality of support ribs 106 extending across the upper opening 104. The lower PRV flap 300 is similarly attached to the housing 102 over a lower opening 108. The lower opening 108 further includes a plurality of support ribs 110 and a pair of selective coupling features 112 configured to selectively couple the housing 102 into a vehicle (not shown).

Referring now to FIGS. 3 and 4, the upper PRV flap 200 includes an attachment portion 202, a hinge portion 204, and a main portion 206. The attachment portion 202 has one or more mounting features 208 configured for mounting the upper PRV flap 200 to the housing 102. As depicted, in some instances, the mounting features 208 may comprise elongated slots configured to receive corresponding mounting features 114 of the housing 102 disposed adjacent the upper opening 104 (see FIG. 1). In some instances, the upper PRV flap 200 may be attached to the housing 102 in various other manners. For example, the upper PRV flap 200 may be attached to the housing 102 using nuts and bolts, screws, snap on buttons, hook and loop fasteners (e.g., Velcro®), or any other suitable attachment mechanism desired for a given application.

Figure 5:
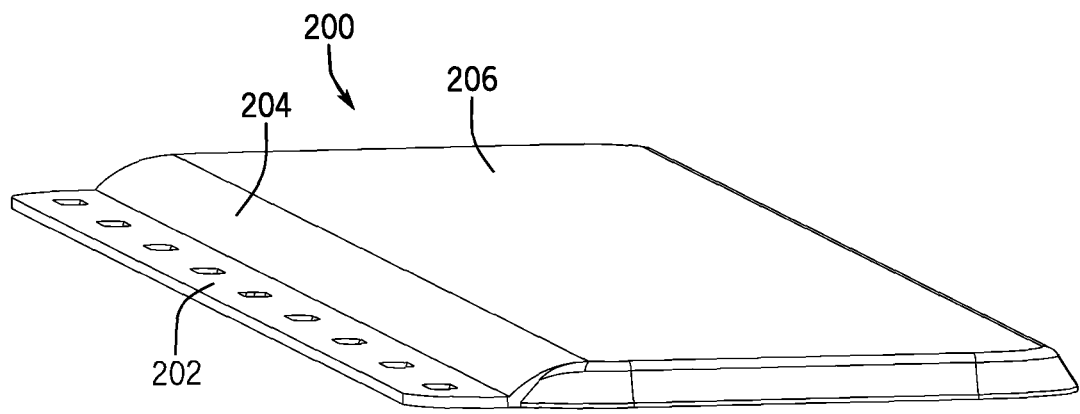
FIG. 5 is a side perspective view of the upper pressure relief valve flap of FIG. 3.

Referring now to FIG. 5, the hinge portion 204 is disposed proximate the attachment portion 202 and extends along a length of the upper PRV flap 200. The hinge portion 204 is generally configured to allow the upper PRV flap 200 to bend open at a desired or target cabin pressure. As seen in the depicted example, the hinge portion 204 is interposed between the main portion 206 and the attachment portion 202. The size and shape of the hinge portion 204, along with the material employed for the upper PRV flap 200, are configured to allow the main portion 206 to bend or flex, with respect to the attachment portion 202, away from the housing 102 into an opened position at a target pressure difference between an internal vehicle pressure and an external vehicle pressure. This allows for the passage of air through the upper opening 104 in the housing 102, while also resiliently biasing the main portion 206 back to a closed position in the absence of the target pressure difference.

The particular size and shape of the hinge portion 204 may vary based on the given application (e.g., the size of the housing, the value of the target pressure difference, the material used for the upper PRV flap 200, etc.). In any case, the hinge portion 204 may provide a reduced forward air flow resistance compared to traditional flap spring methods, while also reducing the tension and spring-back condition when the PRV flap 200 returns to the closed position.

Referring again to FIG. 4, the main portion 206 includes a lip 210, a central portion 212, a plurality of primary damping features 214, and a plurality of secondary damping features 216. The lip 210 may extend around a portion of a periphery of the central portion 212. For example, the lip 210 of the depicted example extends around three sides of the perimeter of the central portion 212 of the PRV flap 200, thereby forming a generally U-shaped feature with respect to the attachment portion 202. The lip 210 further extends away from the central portion 212 of the main portion 206 of the upper PRV flap 200 in a direction oriented generally toward the housing 102 when the upper PRV flap 200 is mounted thereon. As such, the lip 210 provides a housing contact surface 218 (shown in FIG. 6) that is configured to contact the housing 102 when the upper PRV flap 200 is in the closed position.

When the upper PRV flap 200 is moved to the closed position, the lip 210 (e.g., the housing contact surface 218) is brought into contact with a contact surface 116 (shown in FIG. 7) surrounding the upper opening 104 of the housing 102 associated with the upper PRV flap 200, with the lip 210 contacting the housing 102 and the central portion 212 arranged away from the housing 102. As such, the surface area of the upper PRV flap 200 that is brought into physical contact with the housing 102 is minimized. Accordingly, the arrangement of the lip 210 with respect to the central portion 212 may act as an additional damping feature as discussed herein.

Further, in some instances, the upper PRV flap 200 may have a thickness 220 (shown in FIG. 6) that corresponds to (e.g., is identical to or about the same as) the thickness of a comparable die cast flap, facilitating convenient retro-fitting of the upper PRV flap 200 to housings previously used with die cast flaps. For example, the thickness 220 of the upper PRV flap 200 may be between approximately 0.5 mm and approximately 0.7 mm.

Referring again to FIG. 4, the plurality of primary damping features 214 each form a hollow cylindrical shape and extend away from the central portion 212 in the same general direction as the lip 210. In the illustrated example, the primary damping features 214 are evenly spaced in a generally linear arrangement proximate a distal end 222 of the main portion 206 disposed opposite the attachment portion 202. As best shown in FIG. 2, when the upper PRV flap 200 is attached to the housing 102, the primary damping features 214 may each be generally aligned with a corresponding one of the plurality of support ribs 106.

Figure 7:
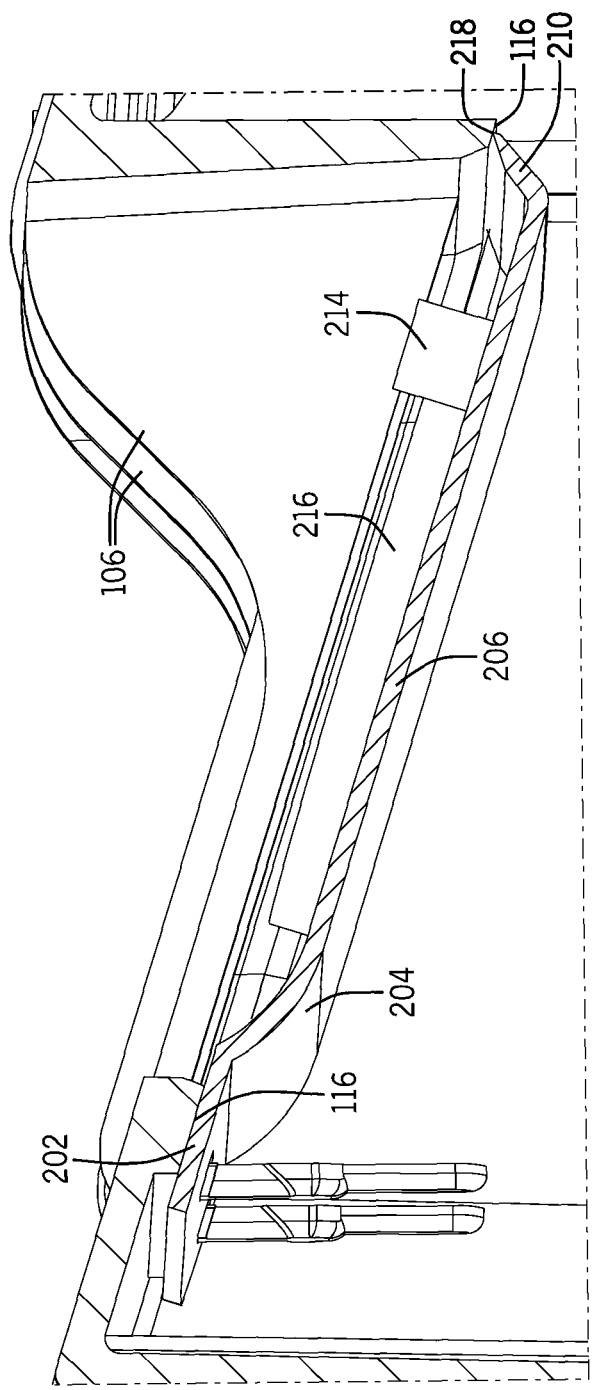
FIG. 7 is a cross-sectional view of the housing and the upper pressure relief valve flap of FIG. 2, taken along line 7-7.

Turning to FIG. 7, the plurality of support ribs 106 may be slightly recessed from the contact surface 116 of the housing 102. In some instances, the primary damping features 214 may extend past the housing contact surface 218 of the lip 210 a distance that corresponds with this recession, such that the primary damping features 214 contact the corresponding support ribs 106 prior to the housing contact surface 218 of the lip 210 contacting the contact surface 116 of the housing 102. In some instances, the primary damping features 214 may be configured to have an approximately 0.25 mm interference fit with the support ribs 106 when the housing contact surface 218 of the lip 210 makes contact with the housing 102. In other instances, the primary damping features 214 may be configured to have a larger or smaller interference fit with the support ribs 106, as desired for a given application.

As such, when the upper PRV flap 200 is moved from the opened position to the closed position, the plurality of primary damping features 214 contact the plurality of support ribs 106 prior to the housing contact surface 218 of the lip 210 making contact with the housing 102. After the plurality of primary damping features 214 contact the corresponding support ribs 106, the biasing force provided by the hinge portion 204 onto the main portion 206 is sufficient to slightly compress the primary damping features 214, thereby allowing for the housing contact surface 218 of the lip 210 to make contact with the contact surface 116 of the housing 102 around the upper opening 104. With the lip 210 being forced into contact with the housing 102 by the hinge portion 204, a pressure-dependent seal is formed therebetween.

Referring again to FIG. 4, the plurality of secondary damping features 216 each similarly form a hollow cylindrical shape and extend away from the central portion 212 in the same general direction as both the lip 210 and the primary damping features 214. In the illustrated example, the secondary damping features 216 are similarly evenly spaced across the main portion 206. However, the secondary damping features 216 define substantially larger diameters than the primary damping features 214. For example, in some instances, each of the secondary damping features 216 may define a diameter between approximately 10 mm and approximately 30 mm, and each of the primary damping features 214 may define a diameter of approximately 2.5 mm to approximately 5 mm.

Figure 6:
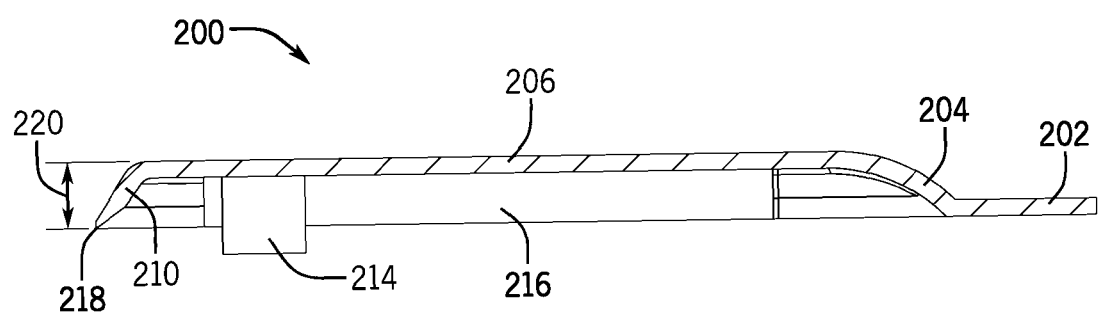
FIG. 6 is a cross-sectional view of the upper pressure relief valve flap of FIG. 3, taken along line 6-6.

As best shown in FIG. 6, the secondary damping features 216 extend generally evenly with the housing contact surface 218 of the lip 210. Accordingly, the primary damping features 214 and the lip 210 may generally prevent the secondary damping features 216 from contacting the plurality of support ribs 106. However, under severe and/or sudden pressure changes within the vehicle (e.g., door slams, air bag deployments, etc.) the secondary damping features 216 may provide additional damping to the upper PRV flap 200.

In the illustrated example of FIG. 4, the main portion 206 of the upper PRV flap 200 includes three evenly-spaced secondary damping features 216 and six primary damping features 214 split into two evenly-spaced groups of three by a middle secondary damping feature 216. In other examples, there may be more or less primary and secondary damping features 214, 216, as desired for a given application.

Figure 8:
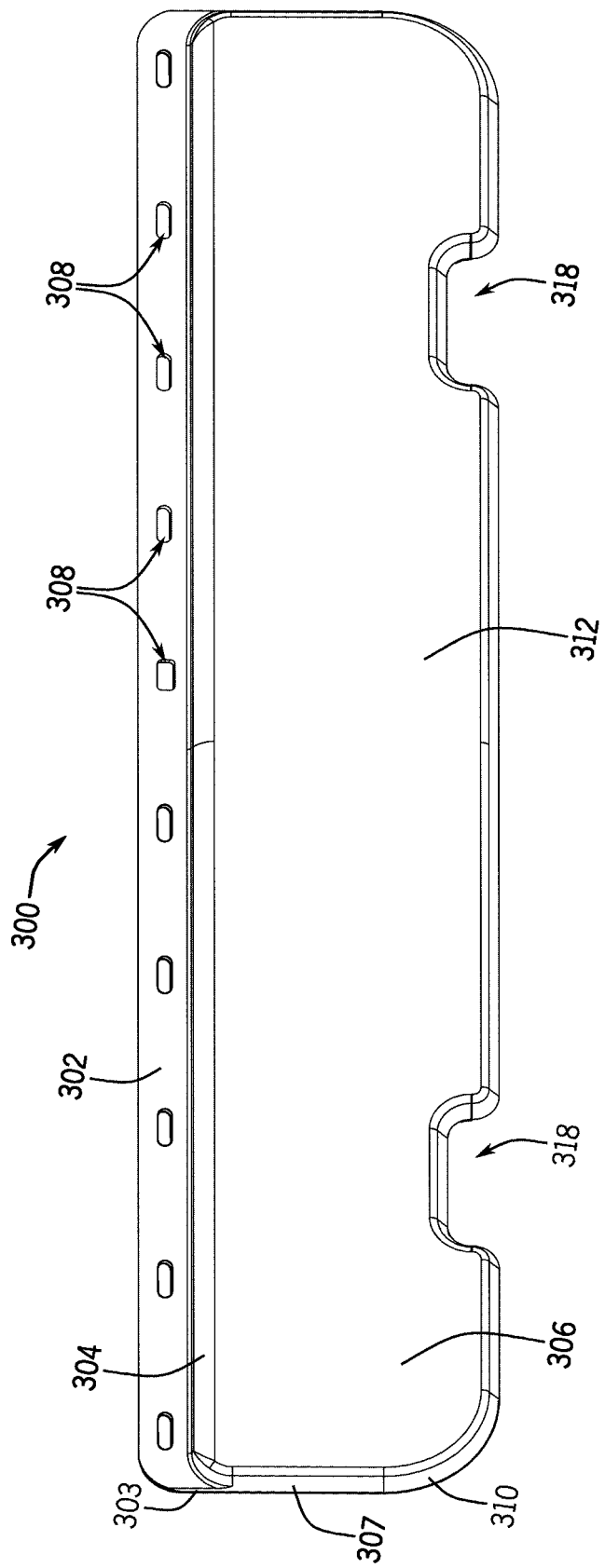
FIG. 8 is a front perspective view of the lower pressure relief valve flap of FIG. 1, in accordance with aspects of the present disclosure.
Figure 9:
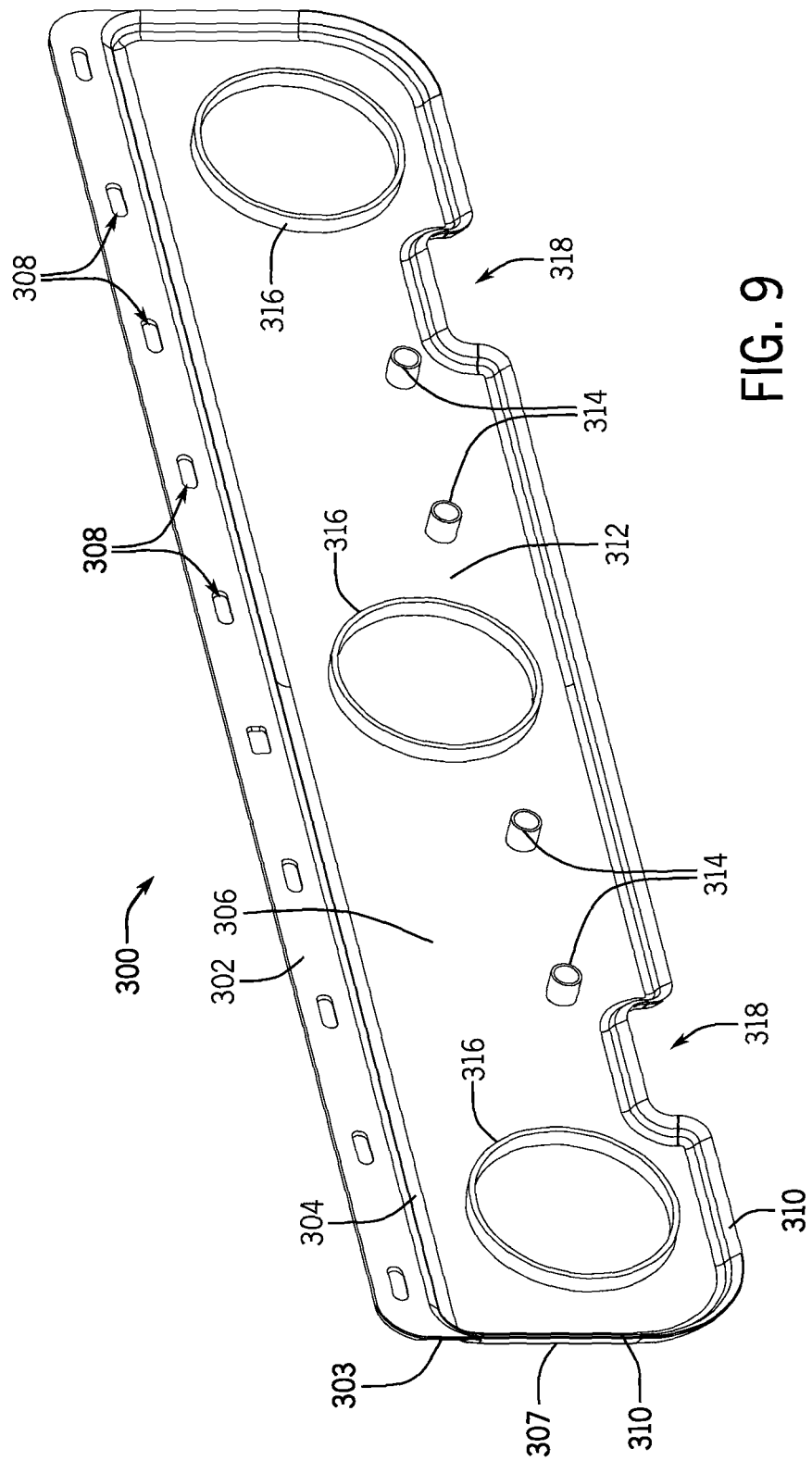
FIG. 9 is a rear perspective view of the lower pressure relief valve flap of FIG. 8.

Referring now to FIGS. 1, 8 and 9, the lower PRV flap 300 is configured to be mounted to the housing 102, covering the lower opening 108, and may be substantially similar to the upper PRV flap 200. As such, similar features will be labeled similarly in the 300 series (e.g., attachment portion 202 and attachment portion 302, hinge portion 204 and hinge portion 304, main portion 206 and main portion 306, etc.). Accordingly, the following description will be directed toward the differences between the upper PRV flap 200 and the lower PRV flap 300. However, it will be appreciated that the above description of the upper PRV flap 200 also pertains to the lower PRV flap 300, except as detailed below. Further, various aspects of the upper PRV flap 200 and the lower PRV flap 300 may be interchangeable as desired for a given application, and neither the description of the upper PRV flap 200 nor the description of the differences between the upper PRV flap 200 and the lower PRV flap 300 are intended to be limiting in any way.

As illustrated, the lower PRV flap 300 similarly includes an attachment portion 302, a hinge portion 304, and a main portion 306. The attachment portion 302 similarly includes mounting features 308 configured to receive corresponding mounting features 118 of the housing 102 disposed adjacent the lower opening 108. However, lateral sides 303 of the attachment portion 302 of the lower PRV flap 300 are substantially flush with lateral sides 307 of the main portion 306. In some instances, the configuration of the attachment portion 302 relative to the main portion 306 may be dependent on the configuration of the housing 102. For example, the main portion 306 further includes two selective coupling feature slots 318 configured to provide clearance for the selective coupling features 112 of the housing 102. However, in instances where the housing 102 does not include the selective coupling features 112, the slots 318 may not be included.

As shown in FIG. 9 the main portion 306 of the lower PRV flap 300 includes four primary damping features 314, which are split into two evenly-spaced groups of two on either side of the middle secondary damping feature 316. It should be appreciated that the upper PRV flap 200 or the lower PRV flap 300 may include more or less primary or secondary damping features, as desired for a given application or based on the configuration of a given housing. Additionally, the arrangement of the primary and secondary damping features on the PRV flaps may be dependent on the configuration of the housing or the desired amount of dampening of the system. Accordingly, the number and arrangement of the primary and secondary damping features described herein are not meant to be limiting in any way.

It should also be appreciated that the upper PRV flap 200, including the attachment portion 202, the hinge portion 204, and the main portion 206, may be integrally formed as a single unit. Similarly, the lower PRV flap 300, including the attachment portion 302, the hinge portion 304, and the main portion 306, may be integrally formed as a single unit. For example, the entire upper PRV flap 200 may be formed as a single integral unit in a compression molding process. Likewise, the entire lower PRV flap 300 may be formed as a single integral unit in a compression molding process.

It should additionally be noted that using a compression molding process to form the upper PRV flap 200 and/or the lower PRV flap 300 may allow for the corresponding primary and secondary damping features 214, 216, 314, 316 to be created without inducing pre-stress into the corresponding PRV flap 200, 300. Thus, by using a compression molding process, the PRV flaps 200, 300 may be resistant to distortion and/or warping, and may therefore provide an effective seal against the housing 102.

In some instances, both the upper and lower PRV flaps 200, 300 may be formed of a rubber material. For example, the upper and lower PRV flaps 200, 300 may be formed of ethylene propylene diene terpolymer (EPDM) rubber.

Additionally, in some instances, the primary and secondary damping features 214, 216, 314, 316 of the PRV flaps 200, 300 may be used to contact the front side of an additional PRV flap during a manufacturing and/or transport process in which multiple PRV flaps are stacked on top of each other. Accordingly, the primary and secondary damping features 214, 216, 314, 316 may provide for improved separation of the stacked flaps allowing easier, more convenient selection and grasping of an individual flap during an automated process.

Accordingly, described herein are various pressure relief valve flaps that can replace traditional die cut or injection molded flap components. The compression-molded flaps may allow for the inclusion of various damping features, which may provide a reliable pressure-dependent seal while dampening flap noise. This dampening may be achieved by reducing the initial contacting surfaces between the PRV flaps and the housing.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention.

All of the publications described herein, including patents and non-patent publications are hereby incorporated herein by reference in their entireties.

We claim:

1. A pressure relief system configured to provide pressure relief between an internal vehicle pressure and an external vehicle pressure, the pressure relief system comprising:
 a housing having an opening;
 a pressure relief valve flap formed in a compression molding process and comprising:
  an attachment portion attached to the housing;
  a main portion resistant to warping and having at least one damping feature and being movable between a closed position, in which a periphery of the main portion engages the housing around the opening and provides a pressure-dependent seal between the main portion and the housing, and an opened position, in which the main portion is disengaged from the housing; and
  a hinge portion disposed between and connecting the main portion and the attachment portion,
 wherein, when the main portion moves from the opened position to the closed position, the at least one damping feature is configured to engage the housing prior to the periphery of the main portion and thereby dampen noise created when the periphery of the main portion engages the housing.

2. The pressure relief system of claim 1, wherein the housing further includes at least one support rib extending across the opening.

3. The pressure relief system of claim 2, wherein when the main portion moves from the opened position to the closed position, the at least one damping feature is configured to engage the at least one support rib.

4. The pressure relief system of claim 1, wherein the hinge portion is configured to bias the main portion into the closed position.

5. The pressure relief system of claim 1, wherein the at least one damping feature is at least one primary damping feature, and the main portion further includes at least one secondary damping feature, the at least one secondary damping feature defining a smaller height than the primary damping feature in a direction perpendicular to the main portion.

6. The pressure relief system of claim 1, wherein the main portion further comprises a lip extending around at least a portion of the periphery of the main portion.

7. The pressure relief system of claim 1, wherein the pressure relief valve flap is formed as a single integral unit.

8. The pressure relief system of claim 1, wherein the at least one damping feature is a plurality of damping features, and wherein each of the plurality of damping features is configured to engage the housing prior to the periphery of the main portion.

9. A pressure relief valve flap configured to be mounted in a housing to provide pressure relief between an internal vehicle pressure and an external vehicle pressure, the housing having an opening, the pressure relief valve flap comprising:
- an attachment portion configured to be attached to the housing;
- a main portion;
- a lip bent relative to and extending from the main portion toward the housing and around at least a portion of a periphery of the main portion; and
- a hinge portion disposed between and connecting the main portion and the attachment portion,
- wherein, when the attachment portion is attached to the housing, the main portion is configured to move between a closed position, in which the lip of the main portion engages the housing around the opening and provides a pressure-dependent seal between the main portion and the housing, and an opened position, in which the main portion is disengaged from the housing, and, when the main portion moves from the opened position to the closed position, at least one damping feature is configured to engage the housing prior to the lip of the main portion and thereby dampen noise created when the lip of the main portion engages the housing.

10. The pressure relief valve flap of claim 9, wherein when the attachment portion is attached to the housing, the hinge portion is configured to bias the main portion into the closed position.

11. The pressure relief valve flap of claim 9, wherein the at least one damping feature defines a hollow, cylindrical shape.

12. The pressure relief valve flap of claim 9, wherein the at least one damping feature is at least one primary damping feature, and the main portion further includes at least one secondary damping feature.

13. The pressure relief valve flap of claim 9, wherein the pressure relief valve flap is formed as a single integral unit in a compression molding process.

14. The pressure relief valve flap of claim 9, wherein the at least one damping feature is a plurality of damping features, and each of the plurality of damping features is configured to engage the housing prior to the lip of the main portion.

15. The pressure relief valve flap of claim 9, wherein the lip extends around three sides of the periphery of the main portion to form a U-shaped feature with respect to the attachment portion.

16. A pressure relief valve flap configured to be mounted in a housing to provide pressure relief between an internal vehicle pressure and an external vehicle pressure, the housing having an opening, the pressure relief valve flap comprising:
- an attachment portion configured to be attached to the housing;
- a main portion having a primary damping feature and a secondary damping feature;
- a lip having a housing contact surface extending around at least a portion of a periphery of the main portion, the housing contact surface extending evenly with the secondary damping feature; and
- a hinge portion disposed between and connecting the main portion and the attachment portion,
- wherein the pressure relief valve flap is formed as a single integral unit in a compression molding process and, when the attachment portion is attached to the housing, the main portion is configured to move between a closed position, in which the periphery of the main portion engages the housing around the opening to provide a pressure-dependent seal between the main portion and the housing, and an opened position, in which the main portion is disengaged from the housing, and
- wherein the hinge portion is configured to bias the main portion into the closed position to compress the primary damping feature to allow the housing contact surface of the main portion to engage the housing, the secondary damping feature defining a smaller height than the primary damping feature in a direction perpendicular to the main portion so that the primary damping feature prevents the secondary damping feature from contacting a rib of the housing.

17. The pressure relief valve flap of claim 16, wherein when the main portion moves from the opened position to the closed position, the primary damping feature is configured to engage the housing prior to the periphery of the main portion and thereby dampen noise created when the periphery of the main portion engages the housing.

18. The pressure relief valve flap of claim 16, wherein the primary damping feature defines a hollow, cylindrical shape.

19. The pressure relief valve flap of claim 16, wherein the secondary damping feature defines a hollow, cylindrical shape.

20. The pressure relief valve flap of claim 16, wherein the primary damping feature includes a plurality of damping features, and each of the plurality of damping features is configured to engage the housing prior to the periphery of the main portion.

* * * * *